US012119734B2

United States Patent
Bando et al.

(10) Patent No.: US 12,119,734 B2
(45) Date of Patent: Oct. 15, 2024

(54) MOTOR WITH COOLING MEDIUM AND FINS FOR HEAT DISSIPATION

(71) Applicant: Nidec Corporation, Kyoto (JP)

(72) Inventors: Takaaki Bando, Kyoto (JP); Takuya Matsuyama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 288 days.

(21) Appl. No.: 17/764,644

(22) PCT Filed: Aug. 21, 2020

(86) PCT No.: PCT/JP2020/031589
§ 371 (c)(1),
(2) Date: Mar. 29, 2022

(87) PCT Pub. No.: WO2021/065240
PCT Pub. Date: Apr. 8, 2021

(65) Prior Publication Data
US 2022/0337128 A1 Oct. 20, 2022

(30) Foreign Application Priority Data

Sep. 30, 2019 (JP) .................. 2019-179731

(51) Int. Cl.
*H02K 9/22* (2006.01)
*H02K 5/173* (2006.01)
(Continued)

(52) U.S. Cl.
CPC ........... *H02K 9/225* (2021.01); *H02K 5/1732* (2013.01); *H02K 5/18* (2013.01); *H02K 5/203* (2021.01);
(Continued)

(58) Field of Classification Search
CPC ........ H02K 9/225; H02K 5/1732; H02K 5/18; H02K 5/203; H02K 7/083; H02K 9/20; H02K 2205/09; H02K 5/20; H02K 9/19
See application file for complete search history.

(56) References Cited

U.S. PATENT DOCUMENTS

| 4,387,762 A | 6/1983 | Rinderle |
| 2018/0083509 A1 | 3/2018 | Yang et al. |

(Continued)

FOREIGN PATENT DOCUMENTS

| CN | 101090217 A | 12/2007 |
| CN | 107800235 A * | 3/2018 |

(Continued)

OTHER PUBLICATIONS

Official Communication issued in corresponding Chinese Patent Application No. 202080067970.7, mailed on Jul. 19, 2023.

(Continued)

*Primary Examiner* — Tulsidas C Patel
*Assistant Examiner* — Joshua M Rodriguez
(74) *Attorney, Agent, or Firm* — Keating & Bennett, LLP

(57) ABSTRACT

A motor includes a rotor rotatable about a central axis and a stator including coils. The stator opposes the rotor with a gap interposed therebetween. A housing defines at least a portion of a closed chamber in which a cooling medium is housed. Heat dissipation portions are able to release heat of the cooling medium in the closed chamber to an outside. A pressure adjustment portion is able to adjust a pressure in the closed chamber. At least a portion of the coils and the rotor is housed in the closed chamber.

13 Claims, 8 Drawing Sheets

(51) Int. Cl.
*H02K 5/18* (2006.01)
*H02K 5/20* (2006.01)
*H02K 7/08* (2006.01)
*H02K 9/20* (2006.01)

(52) U.S. Cl.
CPC ............... *H02K 7/083* (2013.01); *H02K 9/20* (2013.01); *H02K 2205/09* (2013.01)

(56) References Cited

U.S. PATENT DOCUMENTS

| | | |
|---|---|---|
| 2018/0231325 A1 | 8/2018 | Yu et al. |
| 2019/0173358 A1 | 6/2019 | Ishikawa et al. |
| 2020/0177056 A1 | 6/2020 | Nakamura et al. |

FOREIGN PATENT DOCUMENTS

| | | |
|---|---|---|
| CN | 107923716 A | 4/2018 |
| JP | 05-2574 U | 1/1993 |
| JP | 2005-245155 A | 9/2005 |
| JP | 2009-038864 A | 2/2009 |
| JP | 2015-095961 A | 5/2015 |
| JP | 2018-085918 A | 5/2018 |
| JP | 2019-194056 A | 11/2019 |

OTHER PUBLICATIONS

Official Communication issued in International Patent Application No. PCT/JP2020/031589, mailed on Oct. 27, 2020.
Official Communication issued in corresponding Chinese Patent Application No. 202080067970.7, mailed on Dec. 30, 2023.
Official Communication issued in corresponding Chinese Patent Application No. 202080067970.7, mailed on April 8, 2024.

* cited by examiner

MOTOR WITH COOLING MEDIUM AND FINS FOR HEAT DISSIPATION

CROSS-REFERENCE TO RELATED APPLICATIONS

This is a U.S. national stage of application No. PCT/JP2020/031589, filed on Aug. 21, 2020, with priority under 35 U.S.C. § 119(a) and 35 U.S.C. § 365(b) being claimed from Japanese Patent Application No. 2019-179731, filed on Sep. 30, 2019, the entire disclosures of which are hereby incorporated herein by reference.

1. FIELD OF THE INVENTION

The present disclosure relates to a motor.

2. BACKGROUND

A motor having a cooling structure using a cooling medium is known. For example, conventionally, a cooling device of a motor that cools a stator by circulating a refrigerant through a cooling refrigerant passage provided in the stator is described.

In the motor having the cooling structure using the cooling medium, there is a need for further improvement in cooling efficiency of the stator.

SUMMARY

One example embodiment of a motor according to the present disclosure includes a rotor that is rotatable about a central axis, a stator that includes coils and opposes the rotor with a gap interposed therebetween, a housing that defines at least a portion of a closed chamber in which a cooling medium is housed, heat dissipation portions that are able to release heat of the cooling medium in the closed chamber to an outside, and a pressure adjustment portion that is able to adjust a pressure in the closed chamber. At least a portion of the coils and the rotor is housed in the closed chamber.

The above and other elements, features, steps, characteristics and advantages of the present disclosure will become more apparent from the following detailed description of the example embodiments with reference to the attached drawings.

DETAILED DESCRIPTION

In each drawing, a Z-axis direction is a vertical direction. A +Z side is an upper side in the vertical direction, and a −Z side is a lower side in the vertical direction. In the following description, the upper side and the lower side in the vertical direction are referred to simply as the "upper side" and the "lower side", respectively. Further, a central axis J appropriately shown in each drawing extends in the Z-axis direction, that is, in the vertical direction. In the following description, a direction parallel to an axial direction of the central axis J, that is, the vertical direction is simply referred to as the "axial direction". Further, a radial direction about the central axis J is simply referred to as a "radial direction", and a circumferential direction about the central axis J is simply referred to as a "circumferential direction". In the present example embodiment, the upper side corresponds to one side in the axial direction. Note that, the vertical direction, the upper side, and the lower side are simply names for describing an arrangement relationship between portions and the like, and an actual arrangement relationship may be an arrangement relationship other than the arrangement relationship indicated by these names.

Figure 1:
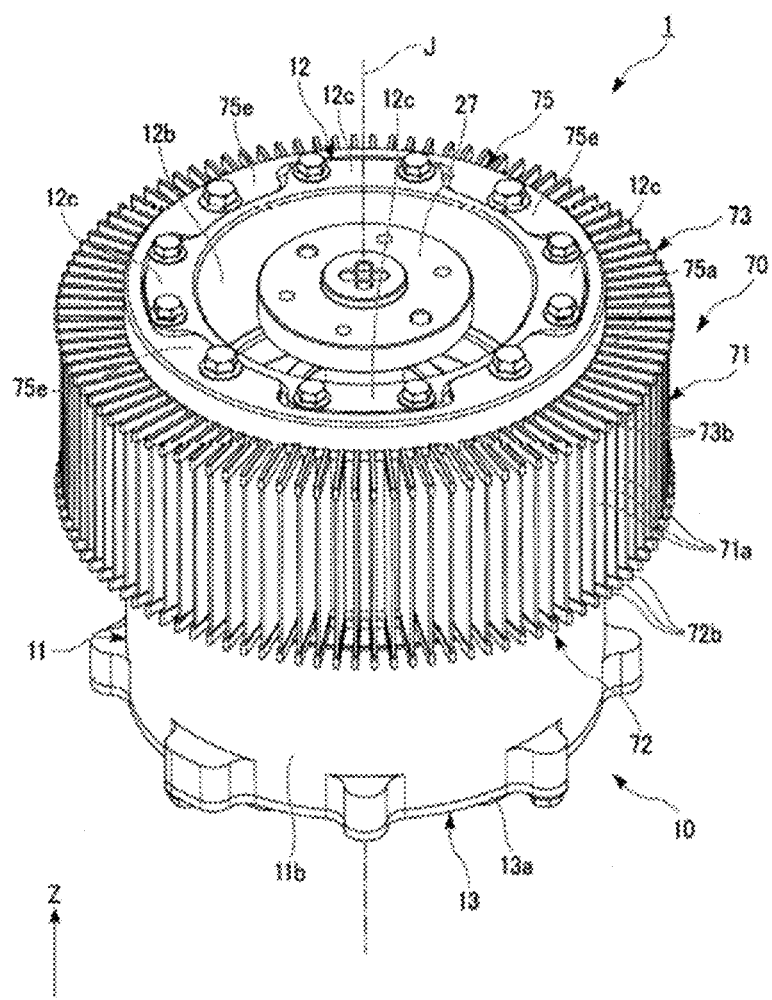
FIG. 1 is a perspective view showing a motor according to an example embodiment of the present disclosure.
Figure 2:
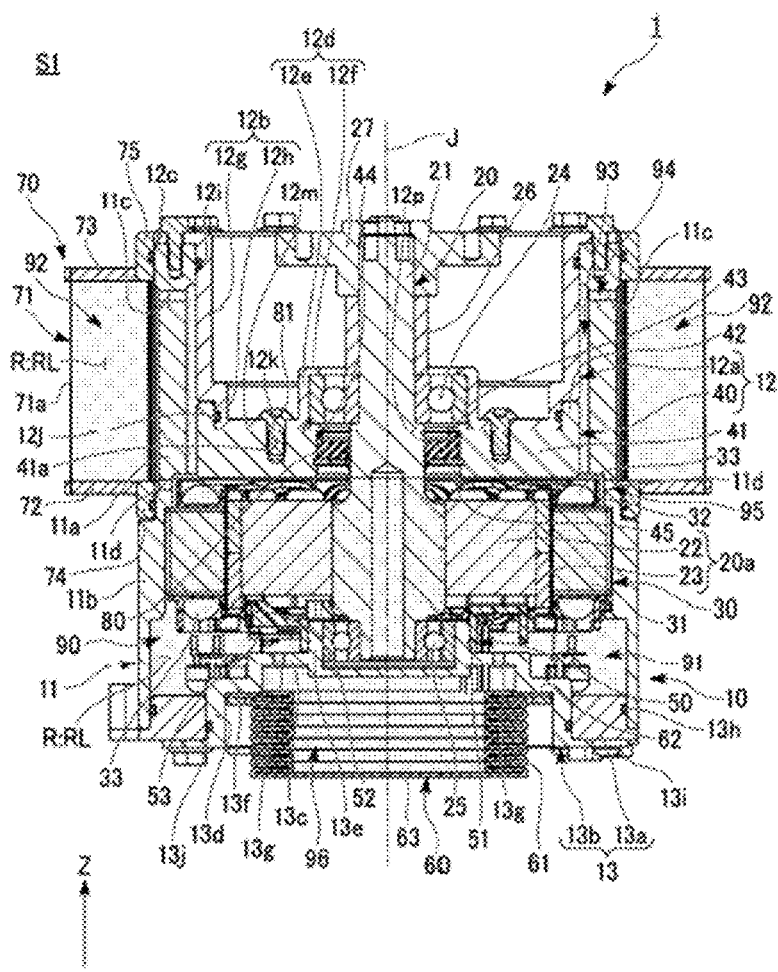
FIG. 2 is a cross-sectional view showing a first state of a motor according to an example embodiment of the present disclosure.
Figure 3:
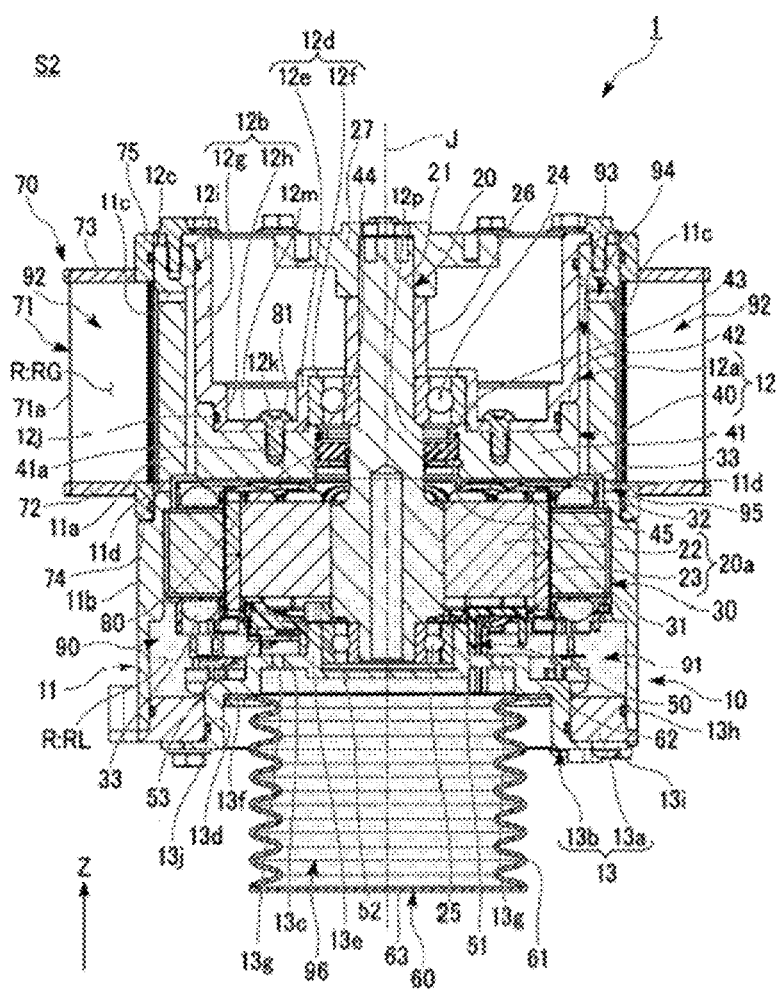
FIG. 3 is a cross-sectional view showing a second state of a motor according to an example embodiment of the present disclosure.

A motor 1 according to the present example embodiment shown in FIG. 1 is a motor mounted on an unmanned aerial vehicle. The motor 1 rotates a propeller of an unmanned aerial vehicle. As shown in FIGS. 2 and 3, the motor 1 according to the present example embodiment includes a housing 10, a rotor 20, a stator 30, a sensor assembly 50, a pressure adjustment portion 60, a fin assembly 70, and a sealing member 80, an upper bearing 24, and a lower bearing 25. In the present example embodiment, the upper bearing 24 and the lower bearing 25 are rolling bearings. The upper bearing 24 and the lower bearing 25 are, for example, ball bearings.

The housing 10 internally houses the rotor 20, the stator 30, the sensor assembly 50, the sealing member 80, the upper bearing 24, and the lower bearing 25. The housing 10 has a housing body 11, an upper lid portion 12, and a lower lid portion 13. The housing body 11 has a tubular shape extending in the axial direction. The housing body 11 has, for example, a cylindrical shape about the central axis J with openings on both sides in the axial direction. An outer diameter of an upper portion 11a of the housing body 11 is smaller than an outer diameter of a lower portion 11b of the housing body 11. An inner diameter of the upper portion 11a of the housing body 11 is smaller than an inner diameter of the lower portion 11b of the housing body 11. A step portion is provided between an outer peripheral surface of the upper portion 11a and an outer peripheral surface of the lower portion 11b in the axial direction.

The housing body 11 has hole portions 11c and 11d. The hole portions 11c and 11d are provided in the upper portion 11a. The hole portions 11c and 11d penetrate the upper portion 11a in the radial direction from an inner peripheral surface to an outer peripheral surface. The hole portions 11c and 11d are, for example, circular holes. An inner diameter of the hole portion 11c and an inner diameter of the hole portion 11d are, for example, the same. Note that, the inner diameter of the hole portion 11c and the inner diameter of the hole portion 11d may be different from each other.

The hole portion 11c is positioned above the hole portion 11d. A plurality of hole portions 11c and a plurality of hole portions 11d are provided along the circumferential direction. For example, the plurality of hole portions 11c are arranged at equal intervals over an entire circumference along the circumferential direction. For example, the plurality of hole portion 11d are arranged at equal intervals over an entire circumference along the circumferential direction. The number of hole portions 11c and the number of hole portions 11d are, for example, the same as each other. Note that, the number of hole portions 11c and the number of hole portions 11d may be different from each other.

The upper lid portion 12 is fixed to an upper end portion of the housing body 11 and closes an upper opening of the housing body 11. The upper lid portion 12 corresponds to a lid portion positioned above the stator 30. In the present example embodiment, the upper lid portion 12 has a first holding member 12a and a second holding member 40.

The first holding member 12a is a member that holds the upper bearing 24. The first holding member 12a has a bottom portion 12m, a tubular portion 12b, fixing portions 12c, and a bearing holding portion 12d. The bottom portion 12m has, for example, a plate shape in which a plate surface is oriented toward the axial direction, and has an annular shape about the central axis J. The bottom portion 12m is positioned on an inside of the upper portion 11a of the housing body 11 in the radial direction.

The tubular portion 12b has a tubular shape that extends upward from an outer edge portion of the bottom portion 12m in the radial direction. The tubular portion 12b has, for example, a cylindrical shape about the central axis J. The tubular portion 12b is arranged so as to face on the inside of the housing body 11 in the radial direction with a gap interposed therebetween. The tubular portion 12b has a tubular portion body 12g and a fitting portion 12h connected to a lower side of the tubular portion body 12g. An upper end portion of the tubular portion body 12g is an upper end portion of the tubular portion 12b.

The fitting portion 12h is a portion connected to the outer edge portion of the bottom portion 12m in the radial direction. In the present example embodiment, the fitting portion 12h is a lower end portion of the tubular portion 12b. An outer diameter of the fitting portion 12h is smaller than an outer diameter of the tubular portion body 12g. An inner diameter of the fitting portion 12h is smaller than an inner diameter of the tubular portion body 12g. A step portion is provided between an outer peripheral surface of the tubular portion body 12g and an outer peripheral surface of the fitting portion 12h in the axial direction.

In the present example embodiment, an O-ring 12i is provided between the tubular portion 12b and the housing body 11 in the radial direction. The O-ring 12i is provided between the outer peripheral surface of the upper end portion of the tubular portion body 12g and the inner peripheral surface of the upper end portion of the housing body 11 in the radial direction. The O-ring 12i is in contact with the outer peripheral surface of the tubular portion body 12g and the inner peripheral surface of the housing body 11 to seal between the outer peripheral surface of the tubular portion body 12g and the inner peripheral surface of the housing body 11. The O-ring 12i is, for example, fitted into a groove provided on the outer peripheral surface of the tubular portion body 12g and is held by the tubular portion 12b.

The fixing portions 12c protrude to an outside in the radial direction from the upper end portion of the tubular portion 12b. The fixing portions 12c are in contact with the upper end portion of the housing body 11. The fixing portions 12c are fixed to the upper end portion of the housing body 11 by a bolt. As a result, the upper lid portion 12 is fixed to the housing body 11. As shown in FIG. 1, a plurality of fixing portions 12c are provided along the circumferential direction. For example, the plurality of fixing portions 12c are arranged at equal intervals over an entire circumference along the circumferential direction. For example, four fixing portions 12c are provided. The fixing portions 12c extend in the circumferential direction. Each of the fixing portions 12c is fixed to the housing body 11 by two bolts.

As shown in FIGS. 2 and 3, the bearing holding portion 12d is connected to an inner edge portion of the bottom portion 12m in the radial direction. The bearing holding portion 12d has a peripheral wall portion 12e extending upward from the inner edge portion of the bottom portion 12m in the radial direction, and a protrusion portion 12f protruding to the inside in the radial direction from the upper end portion of the peripheral wall portion 12e. The peripheral wall portion 12e has, for example, a cylindrical shape about the central axis J. The upper bearing 24 is fitted into the inside of the peripheral wall portion 12e in the radial direction. As a result, the upper bearing 24 is fitted into the bearing holding portion 12d. The protrusion portion 12f has, for example, an annular shape about the central axis J. The protrusion portion 12f supports an outer ring of the upper bearing from above. As a result, the bearing holding portion 12d supports the upper bearing 24 from above.

The second holding member 40 is a member that holds the sealing member 80. The second holding member 40 is fixed to a lower side of the first holding member 12a. The second holding member 40 is positioned on the inside of the upper portion 11a of the housing body 11 in the radial direction. The second holding member 40 has a second holding member body 41, a fitting portion 42, a first support portion 43, and a second support portion 44. The second holding member body 41 has an annular shape surrounding the central axis J. The second holding member body 41 has, for example, an annular shape about the central axis J. The second holding member body 41 is positioned below the bottom portion 12m.

The second holding member body 41 has female screw holes 41a that are recessed downward from an upper surface of the second holding member body 41. A plurality of female screw holes 41a are provided along the circumferential direction. For example, the plurality of the female screw holes 41a are arranged at equal intervals over an entire circumference along the circumferential direction. A bolt 81 that penetrates a hole portion 12k provided in the bottom portion 12m from above is fastened to the female screw hole 41a. As described above, in the present example embodiment, the second holding member 40 is fixed to the first holding member 12a by the bolt 81 that penetrates the first holding member 12a from above and is fastened to the second holding member 40.

A retaining ring 45 is attached to an inner peripheral surface of the second holding member body 41. An outer edge portion of the retaining ring 45 in the radial direction is fitted into a groove provided on the inner peripheral surface of the second holding member body 41. The retaining ring 45 is, for example, a C-shaped retaining ring or the like. The retaining ring 45 protrudes to an inside in the radial direction from the inner peripheral surface of the second holding member body 41. The retaining ring 45 supports the sealing member 80 from below.

The fitting portion 42 has a tubular shape that protrudes upward from an outer edge portion of the second holding member body 41 in the radial direction. The fitting portion 42 has a cylindrical shape about the central axis J, and is opened upward. The fitting portion 42 is positioned on an outside of the fitting portion 12h of the first holding member 12a in the radial direction, and is fitted to the fitting portion 12h. That is, in the present example embodiment, the first holding member 12a and the second holding member 40 have the fitting portions 12h and 42 that are fitted to each other. Thus, the first holding member 12a and the second holding member 40 can be fixed to each other with high relative position accuracy.

An O-ring 12j is provided between the outer peripheral surface of the fitting portion 12h and an inner peripheral surface of the fitting portion 42 in the radial direction. The O-ring 12j is in contact with the outer peripheral surface of the fitting portion 12h and the inner peripheral surface of the fitting portion 42 to seal between the outer peripheral surface of the fitting portion 12h and the inner peripheral surface of the fitting portion 42. The O-ring 12j is, for example, fitted into a groove provided on the outer peripheral surface of the fitting portion 12h and is held by the tubular portion 12b.

The first support portion 43 protrudes upward from an inner edge portion of the second holding member body 41 in the radial direction. The first support portion 43 has an annular shape surrounding the central axis J. The first support portion 43 has, for example, an annular shape about the central axis J. The first support portion 43 supports the upper bearing 24 from below. More specifically, the first support portion 43 supports the outer ring of the upper bearing 24 from below. As described above, in the present example embodiment, the outer ring of the upper bearing 24 is supported by being sandwiched in the axial direction by the protrusion portion 12f of the bearing holding portion 12d and the first support portion 43 in a state of being in contact with each other.

In the present example embodiment, the second holding member 40 is positioned in the axial direction with respect to the first holding member 12a by bringing the first support portion 43 into contact with the outer ring of the upper bearing 24 from below. A portion of the second holding member 40 excluding the first support portion 43 is arranged so as to face the first holding member 12a with a slight gap interposed therebetween in the axial direction, for example.

The second support portion 44 protrudes to the inside in the radial direction from the upper end portion of the inner peripheral surface of the second holding member body 41. The second support portion 44 is positioned above the retaining ring 45. The second support portion 44 has an annular shape surrounding the central axis J. The second support portion 44 has, for example, an annular shape about the central axis J. The second support portion 44 supports the sealing member 80 from above. As described above, in the present example embodiment, the sealing member 80 is sandwiched and supported in the axial direction by the second support portion 44 and the retaining ring 45 in a state of being in contact with each other. As a result, the sealing member 80 is held by the second holding member 40.

An outer peripheral surface of the second holding member 40 is arranged at the same position in the radial direction as the outer peripheral surface of the tubular portion body 12g of the first holding member 12a, for example. In the present example embodiment, the outer peripheral surface of the second holding member 40 is constituted by an outer peripheral surface of the second holding member body 41 and an outer peripheral surface of the fitting portion 42. A lower surface of the second holding member 40 is positioned above the hole portion 11d.

The upper lid portion 12 has a through-hole 12p that penetrates the upper lid portion 12 in the axial direction. The through-hole 12p is provided so as to straddle the first holding member 12a and the second holding member 40. An inside of the through-hole 12p includes an inside of the bearing holding portion 12d and an inside of the second holding member body 41. A shaft of the rotor 20 to be described later passes through the through-hole 12p.

The lower lid portion 13 is fixed to a lower end portion of the housing body 11 and closes a lower opening of the housing body 11. The lower lid portion 13 is positioned below the stator 30. In the present example embodiment, the lower lid portion 13 has a first lid member 13a and a second lid member 13b. The first lid member 13a is an annular member surrounding the central axis J. The first lid member 13a is fitted and fixed to the inside of the lower end portion of the housing body 11 in the radial direction.

An O-ring 13h is provided between an outer peripheral surface of the first lid member 13a and the inner peripheral surface of the housing body 11 in the radial direction. The O-ring 13h is in contact with the outer peripheral surface of the first lid member 13a and the inner peripheral surface of the housing body 11 to seal between the outer peripheral surface of the first lid member 13a and the inner peripheral surface of the housing body 11. The O-ring 13h is, for example, fitted into a groove provided on the outer peripheral surface of the first lid member 13a and is held by the first lid member 13a.

The second lid member 13b is fixed to an inside of the first lid member 13a in the radial direction. The second lid member 13b has a bottom portion 13c, a tubular portion 13d, a fixing portion 13i, and a bearing holding portion 13e. The bottom portion 13c has, for example, a plate shape in which a plate surface is oriented toward the axial direction, and has an annular shape about the central axis J. The bottom portion 13c is positioned on an inside of the lower portion lib of the housing body 11 in the radial direction. The bottom portion 13c has hole portions 13g that penetrate the bottom portion 13c in the axial direction. A plurality of hole portions 13g are provided along the circumferential direction.

The tubular portion 13d has a tubular shape extending downward from an outer edge portion of the bottom portion 13c in the radial direction. An outer diameter of a lower portion of the tubular portion 13d is larger than an outer diameter of an upper portion of the tubular portion 13d. An inner diameter of the lower portion of the tubular portion 13d is larger than an inner diameter of the upper portion of the tubular portion 13d. A step portion 13f is provided between an inner peripheral surface of the lower portion of the tubular portion 13d and an inner peripheral surface of the upper portion of the tubular portion 13d in the axial direction. The lower portion of the tubular portion 13d is fitted to the inside of the first lid member 13a in the radial direction.

An O-ring 13j is provided between an outer peripheral surface of the lower portion of the tubular portion 13d and an inner peripheral surface of the first lid member 13a in the radial direction. The O-ring 13j is in contact with the outer peripheral surface of the lower portion of the tubular portion 13d and the inner peripheral surface of the first lid member 13a to seal between the outer peripheral surface of the lower portion of the tubular portion 13d and the inner peripheral surface of the first lid member 13a. The O-ring 13j is, for example, fitted into a groove provided on the outer peripheral surface of the lower portion of the tubular portion 13d and is held by the second lid member 13b.

The fixing portion 13i protrudes to an outside in the radial direction from a lower end portion of the tubular portion 13d. The fixing portion 13i is in contact with the lower end portion of the first lid member 13a. The fixing portion 13i is fixed to the lower end portion of the first lid member 13a by a bolt.

The bearing holding portion 13e is connected to an inner edge portion of the bottom portion 13c in the radial direction. The bearing holding portion 13e has a bottom portion on a lower side and has a cylindrical shape that is opened upward. The lower bearing 25 is fitted into and held on an inside of the bearing holding portion 13e in the radial direction.

The rotor 20 is rotatable about the central axis J. The rotor 20 is rotatably supported by the upper bearing 24 and the lower bearing 25. The rotor 20 includes the shaft 21, a rotor body 20a, a spacer 26, and a propeller attachment portion 27.

The shaft 21 extends about the central axis J. The shaft 21 has a columnar shape about the central axis J and extending in the axial direction. A lower portion of the shaft 21 is housed inside the housing 10. A lower end portion of the shaft 21 is rotatably supported by the lower bearing 25. An upper portion of the shaft 21 protrudes to the outside of the housing 10 through the through-hole 12p. The upper portion of the shaft 21 is positioned on the inside of the upper portion 11a and the tubular portion 12b of the housing body 11 in the radial direction. The upper portion of the shaft 21 is rotatably supported by the upper bearing 24. The upper bearing 24 is a bearing that rotatably supports a portion of the shaft 21 that protrudes upward from a closed chamber 90 to be described later.

The rotor body 20a is fixed to the shaft 21. More specifically, the rotor body 20a is fixed to the outer peripheral surface of the lower portion of the shaft 21. The rotor body 20a is housed inside the housing 10. The rotor body 20a includes a rotor core 22 and a magnet 23. The rotor core 22 has an annular shape surrounding the shaft 21. The rotor core 22 is fitted into and fixed to an outer peripheral surface of the shaft 21. The magnet 23 is fixed to an outer peripheral surface of the rotor core 22. A lower end portion of the magnet 23 protrudes downward from the rotor core 22.

The spacer 26 is a cylindrical member that extends in the axial direction and is opened on both sides in the axial direction. The spacer 26 is fitted into the upper portion of the shaft 21. The spacer 26 is positioned above the upper bearing 24. A lower end portion of the spacer 26 is supported from below by an inner ring of the upper bearing 24.

The propeller attachment portion 27 is fixed to an upper end portion of the shaft 21. The propeller attachment portion 27 extends to an outside in the radial direction from the shaft 21. The propeller attachment portion 27 is supported from below by an upper end portion of the spacer 26. A propeller of an unmanned aerial vehicle (not shown) is attached to the propeller attachment portion 27.

The stator 30 is housed inside the housing 10. The stator 30 faces the rotor 20 with a gap interposed therebetween. The stator 30 is positioned on an outside of the rotor 20 in the radial direction. The stator 30 includes a stator core 31, an insulator 32, and a plurality of coils 33. The stator core 31 has an annular shape surrounding the rotor 20. The stator core 31 is arranged so as to face on the outside of the magnet 23 in the radial direction with a gap interposed therebetween. An outer peripheral surface of the stator core 31 is fixed to an inner peripheral surface of the lower portion 11b of the housing body 11. The insulator 32 is attached to the stator core 31. The plurality of coils 33 are attached to the stator core 31 with the insulator 32 interposed therebetween.

The sensor assembly 50 is housed inside the housing 10. The sensor assembly 50 is positioned below the rotor body 20a. The sensor assembly 50 is fixed to the second lid member 13b of the lower lid portion 13. The sensor assembly 50 includes a sensor holder 51, rotation sensors 52, and a circuit board 53. The sensor holder 51 is fitted into and fixed to the bearing holding portion 13e.

The rotation sensor 52 is held by the sensor holder 51. The rotation sensor 52 is a magnetic sensor capable of detecting a magnetic field of the magnet 23. The rotation sensor 52 is, for example, a Hall element such as a Hall IC. The rotation sensor 52 detects the magnetic field of the magnet 23 to detect rotation of the rotor 20. Although not shown in the drawings, a plurality of rotation sensors 52 are arranged along the circumferential direction. The rotation sensors 52 are positioned on the inside of the portion of the magnet 23 in the radial direction that protrudes downward from the rotor core 22. Note that, each rotation sensor 52 may be a magnetoresistance element. The circuit board 53 is fixed to the sensor holder 51. The rotation sensors 52 have terminals electrically connected to the circuit board 53.

The pressure adjustment portion 60 is a portion capable of adjusting the pressure in the closed chamber 90 to be described later. The pressure adjustment portion 60 is fixed to the lower lid portion 13. More specifically, the pressure adjustment portion 60 is fixed to a lower side of the second lid member 13b. In the present example embodiment, the pressure adjustment portion 60 is positioned downward from fins 71a to be described later.

In the present example embodiment, the pressure adjustment portion 60 is a container shape having a variable volume. The pressure adjustment portion 60 is opened upward. An inside of the pressure adjustment portion 60 is connected to the inside of the housing 10 via the hole portion 13g of the second lid member 13b. The pressure adjustment portion 60 is made from rubber, for example. The pressure adjustment portion 60 has a deformed portion 61, a fixing portion 62, and a bottom plate portion 63.

The deformed portion 61 has a cylindrical shape having a bellows structure that can be expanded and contracted in the axial direction. That is, in the present example embodiment, the pressure adjustment portion 60 has a bellows structure. An upper portion of the deformed portion 61 is positioned on an inside of the tubular portion 13d in the radial direction. Note that, FIG. 2 shows, for example, a state where the deformed portion 61 is most contracted. FIG. 3 shows a state where the deformed portion 61 extends in the axial direction from the state of FIG. 2 and the volume of the pressure adjustment portion 60 increases.

The fixing portion 62 protrudes to the outside in the radial direction from an upper end portion of the deformed portion 61. The fixing portion 62 is in a plate shape in which a plate surface is oriented toward the axial direction. The fixing portion is fixed to a stepped surface facing downward in the step portion 13f of the second lid member 13b. As a result, the pressure adjustment portion 60 is fixed to the lower lid portion 13. The bottom plate portion 63 closes a lower end portion of the deformed portion 61. The bottom plate portion 63 has a disk shape about the central axis J.

The fin assembly 70 is provided on an outer peripheral surface of the housing 10. More specifically, the fin assembly 70 is provided on the outer peripheral surface of the upper portion 11a of the housing body 11. In the present example embodiment, almost the entire fin assembly 70 is positioned above the stator 30.

Figure 4:
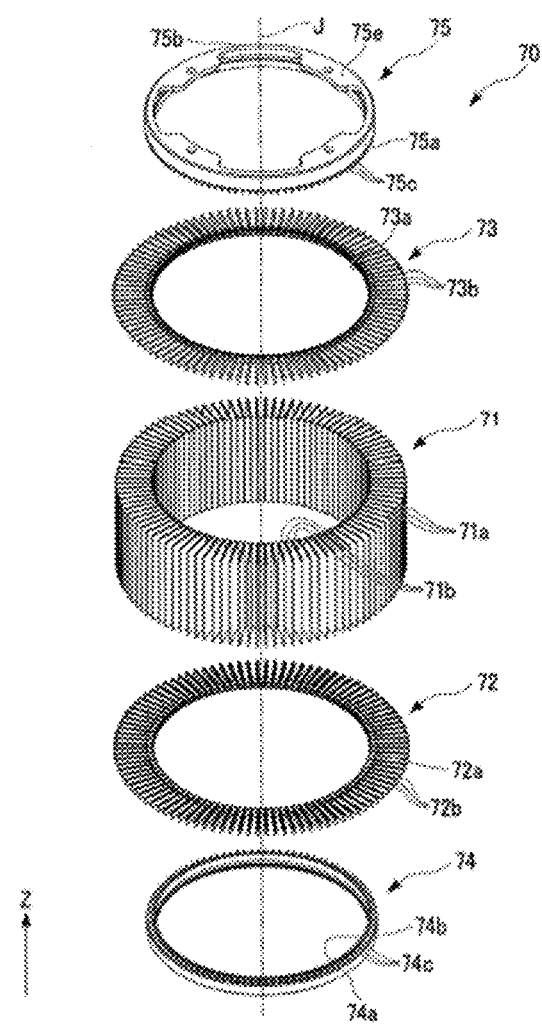
FIG. 4 is an exploded perspective view showing fin assembly according to an example embodiment of the present disclosure.

As shown in FIG. 4, the fin assembly 70 includes a fin member 71, a lower cap member 72, an upper cap member 73, a lower ring member 74, and an upper ring member 75. The fin member 71 has a plurality of fins 71a and a plurality of connection portions 71b. That is, the motor 1 includes the plurality of fins 71a.

Figure 5:
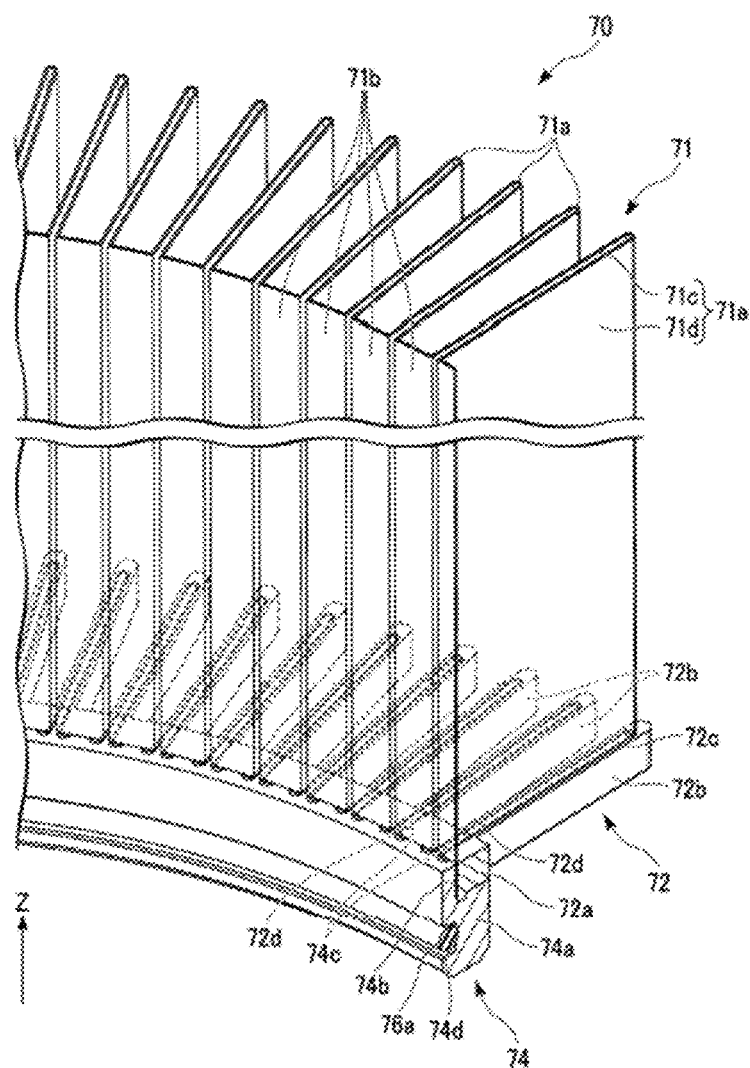
FIG. 5 is a partial cross-sectional perspective view showing a portion of a fin assembly according to an example embodiment of the present disclosure.

In the present example embodiment, the fin 71a has a rectangular plate shape in which a plate surface faces the circumferential direction and is long in the axial direction. The plurality of fins 71a are arranged at equal intervals over an entire circumference along the circumferential direction. As shown in FIG. 5, in the present example embodiment, the fin 71a is a hollow fin. The fin 71a is formed by connecting a pair of plate portions 71c and 71d facing each other with a gap interposed therebetween in the circumferential direction at an outer end portion in the radial direction. An inside of the fin 71a is opened on both sides in the axial direction and an inside in the radial direction.

Figure 6:
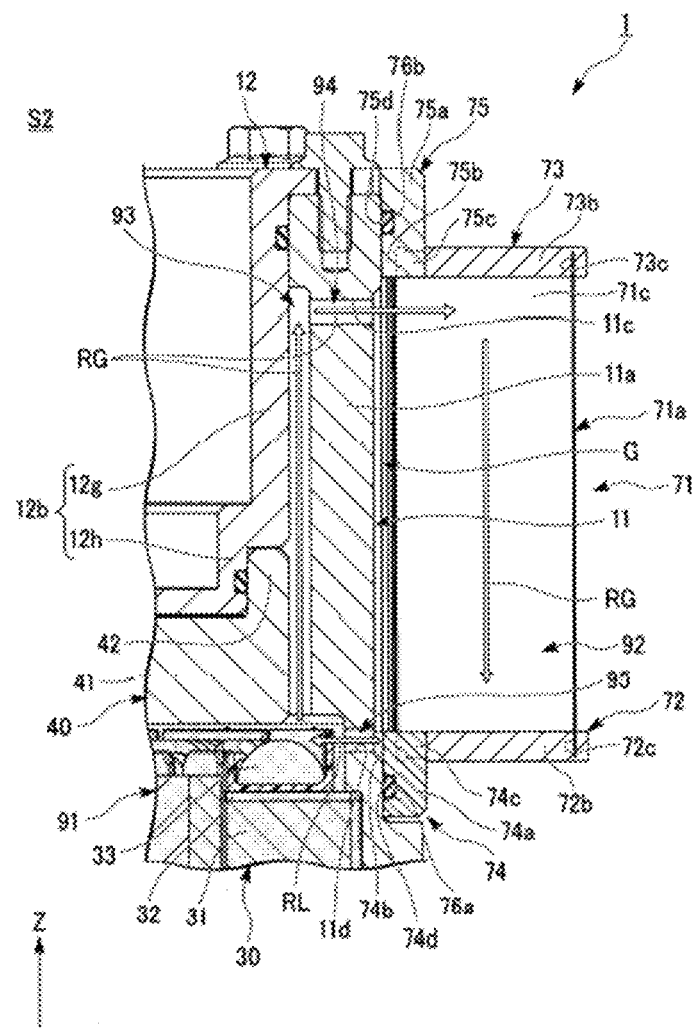
FIG. 6 is a cross-sectional view showing a portion of a motor according to an example embodiment of the present disclosure.

As shown in FIG. 6, the fin 71a is positioned on an outside of the upper portion 11a of the housing body 11 in the radial direction. In the present example embodiment, at least a part of the fins 71a is positioned above the coil 33. For example, the fin 71a is positioned above the coil 33 except for the lower end portion. In the present example embodiment, all the fins 71a are positioned above the stator core 31 of the stator 30. The fins 71a are arranged slightly on the outside in the radial direction from the outer peripheral surface of the upper portion 11a of the housing body 11. That is, an annular gap G is provided between the outer peripheral surface of the housing body 11 and the fins 71a. Insides of the plurality of fins 71a are connected to each other via the gap G. In the present example embodiment, the fins 71a correspond to heat dissipation portions capable of releasing heat of a cooling medium R in the closed chamber 90 to be described later to the outside.

As shown in FIG. 5, the connection portion 71b has a rectangular plate shape in which a plate surface faces in the radial direction and is long in the axial direction. The connection portion 71b connects the inner end portions of the fins 71a in the radial direction which are adjacent to each other in the circumferential direction. More specifically, the connection portion 71b connects the plate portion 71c of one fin 71a of the pair of fins 71a adjacent to each other in the circumferential direction and the plate portion 71d of the other fin 71a of the pair of fins 71a adjacent to each other in the circumferential direction. The fin member 71 is formed in an annular shape surrounding the central axis J as a whole by connecting the plurality of fins 71a by the plurality of connection portions 71b.

In the present example embodiment, the fin member 71 is made from metal. That is, in the present example embodiment, the plurality of fins 71a are made from metal. The metal constituting the fin 71a is, for example, a metal having a relatively high thermal conductivity such as aluminum. A thermal conductivity of the fin 71a is higher than a thermal conductivity of the pressure adjustment portion 60.

The lower cap member 72 is attached to a lower end portion of the fin member 71. The lower cap member 72 closes lower openings of the plurality of fins 71a. The lower cap member 72 has an annular portion 72a and a plurality of lower leg portions 72b. The annular portion 72a has an annular shape about the central axis J. The annular portion 72a has a plurality of slits 72d. The slit 72d is recessed to the outside in the radial direction from an inner peripheral surface of the annular portion 72a and is opened on both sides in the axial direction. For example, the plurality of slits 72d are arranged at equal intervals over an entire circumference along the circumferential direction. An inner edge portion of the fin 71a in the radial direction is inserted into the slit 72d from above.

The plurality of lower leg portions 72b extend to the outside in the radial direction from the annular portion 72a. For example, the plurality of lower leg portions 72b are arranged at equal intervals over an entire circumference along the circumferential direction. Each lower leg portion 72b is positioned on an outside of each slit 72d in the radial direction. The lower leg portion 72b is attached to the lower end portion of each of the plurality of fins 71a. Each lower leg portion 72b closes the lower opening of each fin 71a. An end portion of the lower leg portion 72b on the outside in the radial direction is positioned on the outside in the radial direction from the fin 71a. The lower leg portion 72b has a groove portion 72c that is recessed downward from an upper surface of the lower leg portion 72b. The groove portion 72c has an elongated U-shape that is opened to the inside in the radial direction as viewed from above. The lower end portion of the fin 71a is inserted into the groove portion 72c from above.

As shown in FIG. 1, the upper cap member 73 is attached to an upper end portion of the fin member 71. The upper cap member 73 closes upper openings of the plurality of fins 71a. The upper cap member 73 has the same shape as the shape of the lower cap member 72 inverted in the axial direction. As shown in FIG. 4, the upper cap member 73 has an annular portion 73a and a plurality of upper leg portions 73b.

The annular portion 73a has an annular shape about the central axis J. Similar to the annular portion 72a, a slit into which the upper end portion of the fin 71a is inserted is provided in the annular portion 73a. The plurality of upper leg portions 73b extend to the outside in the radial direction from the annular portion 73a. For example, the plurality of upper leg portions 73b are arranged at equal intervals over an entire circumference along the circumferential direction. The upper leg portion 73b is attached to the upper end portion of each of the plurality of fins 71a. Each upper leg portion 73b closes the upper opening of each fin 71a. As shown in FIG. 6, the upper end portion of the fin 71a is inserted into the groove portion 73c provided in the upper leg portion 73b from below.

The lower ring member 74 is positioned below the lower cap member 72. The lower ring member 74 has an annular shape surrounding the central axis J. The lower ring member 74 has, for example, an annular shape about the central axis J. The lower ring member 74 has a base portion 74a, an inner tubular portion 74b, and a plurality of protrusion plate portions 74c.

The base portion 74a has an annular shape about the central axis J. As shown in FIG. 5, the annular portion 72a is fixed to an upper side of the base portion 74a. The base portion 74a has a groove portion 74d provided on an inner peripheral surface of the base portion 74a. The groove portion 74d has an annular shape about the central axis J. An O-ring 76a is fitted into the groove portion 74d.

As shown in FIG. 6, the base portion 74a is positioned on the outside of the lower end portion of the upper portion 11a of the housing body 11 in the radial direction. The base portion 74a is fitted into the lower end portion of the upper portion 11a of the housing body 11. The inner peripheral surface of the base portion 74a and the outer peripheral surface of the housing body 11 are sealed by the O-ring 76a.

The inner tubular portion 74*b* has a tubular shape protruding upward from an inner edge portion of the base portion 74*a* in the radial direction. The inner tubular portion 74*b* has, for example, a cylindrical shape about the central axis J. As shown in FIG. 5, the inner tubular portion 74*b* is positioned on an inside of the annular portion 72*a* in the radial direction. The inner tubular portion 74*b* and the annular portion 72*a* sandwich a lower end portion of the connection portion 71*b* in the radial direction.

As shown in FIG. 4, the protrusion plate portion 74*c* protrudes upward from a portion of the base portion 74*a* positioned on the outside in the radial direction from the inner tubular portion 74*b*. The protrusion plate portion 74*c* has a plate shape in which a plate surface faces the circumferential direction. For example, the plurality of protrusion plate portions 74*c* are arranged at equal intervals over an entire circumference along the circumferential direction. An end portion of the protrusion plate portion 74*c* on the inside in the radial direction is connected to an outer peripheral surface of the inner tubular portion 74*b*. As shown in FIG. 5, the protrusion plate portion 74*c* is inserted into the slit 72*d*. The protrusion plate portion 74*c* is positioned in the slit 72*d* between the plate portion 71*c* of the fin 71*a* and the plate portion 71*d* in the circumferential direction.

As shown in FIG. 6, an inner peripheral surface of the lower ring member 74 is positioned on the inside in the radial direction from the inner end portion of the fin 71*a* in the radial direction. The inner peripheral surface of the lower ring member is constituted by the inner peripheral surface of the base portion 74*a* and an inner peripheral surface of the inner tubular portion 74*b*.

As shown in FIG. 4, the upper ring member 75 is positioned above the upper cap member 73. The upper ring member 75 has an annular shape surrounding the central axis J. The upper ring member 75 has, for example, an annular shape about the central axis J. The upper ring member 75 has a base portion 75*a*, an inner tubular portion 75*b*, a plurality of protrusion plate portions 75*c*, and fixing portions 75*e*. A portion of the upper ring member 75 excluding the fixing portions 75*e* has the same shape as the shape of the lower ring member 74 inverted in the axial direction.

The base portion 75*a* has an annular shape about the central axis J. The annular portion 73*a* is fixed to a lower side of the base portion 75*a*. As shown in FIG. 6, the base portion 75*a* has a groove portion 75*d* provided on an inner peripheral surface of the base portion 75*a*. The groove portion 75*d* has an annular shape about the central axis J. An O-ring 76*b* is fitted into the groove portion 75*d*.

The base portion 75*a* is positioned on the outside of the upper end portion of the upper portion 11*a* of the housing body 11 in the radial direction. The base portion 75*a* is fitted into the upper end portion of the upper portion 11*a* of the housing body 11. The inner peripheral surface of the base portion 75*a* and the outer peripheral surface of the housing body 11 are sealed by the O-ring 76*b*.

The inner tubular portion 75*b* has a tubular shape protruding downward from an inner edge portion of the base portion 75*a* in the radial direction. The inner tubular portion 75*b* has, for example, a cylindrical shape about the central axis J. The inner tubular portion 75*b* is positioned on an inside of the annular portion 73*a* in the radial direction. The inner tubular portion 75*b* and the annular portion 73*a* sandwich an upper end portion of the connection portion 71*b* in the radial direction.

The protrusion plate portion 75*c* protrudes downward from a portion of the base portion 75*a* positioned on the outside in the radial direction from the inner tubular portion 75*b*. The protrusion plate portion 75*c* has a plate shape in which a plate surface faces the circumferential direction. For example, the plurality of protrusion plate portions 75*c* are arranged at equal intervals over an entire circumference along the circumferential direction. An end portion of the protrusion plate portion 75*c* on the inside in the radial direction is connected to an outer peripheral surface of the inner tubular portion 75*b*. Although not shown, the protrusion plate portion 75*c* is inserted into a slit provided in the annular portion 73*a*. The protrusion plate portion 75*c* is positioned in the slit between the plate portion 71*c* of the fin 71*a* and the plate portion 71*d* in the circumferential direction.

As shown in FIG. 4, the fixing portions 75*e* protrude to the inside in the radial direction from an upper end portion of the base portion 75*a*. The fixing portions 75*e* are in contact with the upper end portion of the housing body 11. The fixing portions 75*e* are fixed to the upper end portion of the housing body 11 by a bolt. As a result, the fin assembly 70 is fixed to the housing body 11. As shown in FIG. 1, a plurality of fixing portions 75*e* are provided along the circumferential direction. For example, the plurality of fixing portion 75*e* are arranged at equal intervals over an entire circumference along the circumferential direction. For example, four fixing portion 75*e* are provided. The fixing portions 75*e* extend in the circumferential direction. Each of the fixing portions 75*e* is positioned between the fixing portions 12*c* adjacent to each other in the circumferential direction.

As shown in FIG. 6, an inner peripheral surface of the upper ring member 75 is positioned on the inside in the radial direction from the inner end portion of the fin 71*a* in the radial direction. The inner peripheral surface of the upper ring member is constituted by the inner peripheral surface of the base portion 75*a* and an inner peripheral surface of the inner tubular portion 75*b*. In the present example embodiment, the inner peripheral surface of the lower ring member 74 and the inner peripheral surface of the upper ring member 75 are positioned on the inside in the radial direction from the inner end portion of the fin 71*a* in the radial direction, and thus, the gap G is provided between the plurality of fins 71*a* and the housing body 11 in the radial direction.

In the present example embodiment, the lower end portion of the fin 71*a* is inserted into the groove portion 72*c* provided in the lower cap member 72, and the protrusion plate portion 74*c* of the lower ring member 74 is inserted between the plate portions 71*c* and 71*d*. The upper end portion of the fin 71*a* is inserted into the groove portion 73*c* provided in the upper cap member 73, and the protrusion plate portion 75*c* of the upper ring member 75 is inserted between the plate portions 71*c* and 71*d*. As a result, it is possible to prevent the plate portions 71*c* and 71*d* from being in contact with each other in the circumferential direction, and it is possible to suitably maintain the hollow fin 71*a* in an opened state.

As shown in FIGS. 2 and 3, the sealing member 80 is held by the second holding member 40. The sealing member 80 has an annular shape surrounding the shaft 21. The sealing member 80 is fitted into the through-hole 12*p*. More specifically, the sealing member 80 is fitted inside the second holding member body 41 in the radial direction. The sealing member 80 is positioned below the upper bearing 24. An outer diameter of the sealing member 80 is smaller than an outer diameter of the upper bearing 24.

In the present example embodiment, the sealing member 80 is a lip seal having a lip portion on the inside in the radial direction. The lip portion of the sealing member 80 is in contact with the outer peripheral surface of the shaft 21. As a result, the sealing member 80 seals between the outer peripheral surface of the shaft 21 and an inner peripheral surface of the through-hole 12p. That is, the sealing member 80 for sealing between the outer peripheral surface of the shaft 21 and the inner peripheral surface of the through-hole 12p is provided below the upper bearing 24.

The motor 1 includes the closed chamber 90. At least a part of the closed chamber 90 is constituted by the housing 10. In the present example embodiment, the closed chamber 90 is constituted by the housing 10, the pressure adjustment portion 60, and the fin assembly 70. The cooling medium R is housed in the closed chamber 90. The cooling medium R is a substance that is a liquid at room temperature. A normal temperature is, for example, equal to or greater than 5° C. and is equal to or less than 35° C. In the following description, the cooling medium R in the liquid state is referred to as a cooling liquid RL, and the cooling medium R in the gaseous state is referred to as a gas RG.

In the present example embodiment, the cooling medium R has an insulation property. Thus, it is not necessary to insulate each portion of the motor 1 that is in contact with the cooling medium R in the closed chamber 90. Accordingly, a reduction in the number of processes to manufacture the motor 1 is achieved. The cooling medium R is, for example, a fluorine-based compound. The fluorine-based compound is not particularly limited as long as the fluorine-based compound is a compound containing a fluorine atom. A lubricant is mixed in the cooling medium R. In the present example embodiment, the lubricant mixed in the cooling medium R is a lubricant used for the ball bearing.

In the present example embodiment, the cooling medium R is filled in the entire inside of the closed chamber 90. FIG. 2 shows a first state S1 where the entire inside of the closed chamber 90 is filled with the cooling liquid RL which is the cooling medium R of the liquid. FIG. 3 shows a second state S2 where the entire inside of the closed chamber 90 is filled with the cooling liquid RL and the gas RG which is the cooling medium R of the gas.

The closed chamber 90 has a cooling chamber 91, a heat dissipation chamber 92, an extension portion 93, a first connection portion 94, a second connection portion 95, and a pressure adjustment chamber 96. The cooling chamber 91 is configured to be surrounded by the lower portion 11b of the housing body 11, the upper lid portion 12, and the lower lid portion 13. That is, the lower portion 11b, the upper lid portion 12, and the lower lid portion 13 constitute a part of a wall portion of the closed chamber 90. The cooling chamber 91 houses the lower portion of the shaft 21, the rotor body 20a, the stator 30, the lower bearing 25, and the sensor assembly 50. That is, the plurality of coils 33 are housed in the cooling chamber 91.

The upper portion of the shaft 21 protrudes upward from the cooling chamber 91 through the through-hole 12p and is arranged outside the closed chamber 90. That is, a part of the shaft 21 is housed in the closed chamber 90, and the shaft protrudes upward from the closed chamber 90 through the through-hole 12p. Since a space between the through-hole 12p and the shaft 21 is sealed by the sealing member 80, leakage of the cooling medium R in the closed chamber 90 from the through-hole 12p is prevented. In the present example embodiment, the sealing member 80 can prevent both the cooling liquid RL and the gas RG from leaking from the through-hole 12p.

The heat dissipation chamber 92 is configured to be surrounded by the fin assembly 70 and the upper portion 11a of the housing body 11. An inside of the heat dissipation chamber 92 includes the inside of the fin 71a and the gap G. That is, the inside of the closed chamber 90 includes the inside of the fin 71a and the gap G. The heat dissipation chamber 92 is positioned on the outside in the radial direction from the cooling chamber 91. The heat dissipation chamber 92 is positioned above the cooling chamber 91, except for a lower end portion. The lower end portion of the heat dissipation chamber 92 is positioned on an outside of an upper end portion of the cooling chamber 91 in the radial direction.

The extension portion 93 extends upward from the cooling chamber 91. In the present example embodiment, the extension portion 93 is positioned above the coil 33. An upper end portion of the extension portion 93 is positioned at substantially the same position in the axial direction as a lower end portion of the upper cap member 73. The upper end portion of the extension portion 93 is closed. In the present example embodiment, the extension portion 93 is provided between the housing body 11 and the tubular portion 12b in the radial direction. The extension portion 93 has a cylindrical shape surrounding the central axis J.

The first connection portion 94 is constituted by the hole portion 11c. The first connection portion 94 extends to the outside in the radial direction from an upper end portion of the extension portion 93 and is connected to the heat dissipation chamber 92. As a result, the first connection portion 94 connects an inside of the extension portion 93 and the inside of the fin 71a. More specifically, the first connection portion 94 is connected to an upper end portion of the gap G, and connects the inside of the extension portion 93 and the inside of the fin 71a via the gap G.

The second connection portion 95 is constituted by the hole portion 11d. The second connection portion 95 is positioned downward from the first connection portion 94. The second connection portion 95 extends to the outside in the radial direction from an upper end portion of the cooling chamber 91 and is connected to the heat dissipation chamber 92. As a result, the second connection portion 95 connects the inside of the fin 71a and an inside of the cooling chamber 91. More specifically, the second connection portion 95 connects an inner lower end portion of the fin 71a with an inner upper end portion of the cooling chamber 91.

The pressure adjustment chamber 96 is configured to be surrounded by the pressure adjustment portion 60 and the lower lid portion 13. An inside of the pressure adjustment chamber 96 includes the inside of the pressure adjustment portion 60. That is, the inside of the closed chamber 90 includes the inside of the pressure adjustment portion 60. The pressure adjustment chamber 96 is positioned below the cooling chamber 91. The inside of the pressure adjustment chamber 96 is connected to the inside of the cooling chamber 91 via the plurality of hole portions 13g.

According to the present example embodiment, the closed chamber 90 houses at least a part of the plurality of coils 33 and the rotor 20. Thus, the coil 33 which is a heating element can be cooled by the cooling medium R housed in the closed chamber 90, and the stator 30 can be suitably cooled. Further, since at least a part of the rotor 20 is housed in the closed chamber 90, the cooling medium R in the closed chamber 90 can be agitated by the rotor 20. As a result, the cooling medium R can be suitably circulated within the closed chamber 90, and the stator 30 can be cooled more preferably. Accordingly, the cooling efficiency of the stator 30 can be improved. Further, at least a part of the rotor 20 can be cooled by the cooling medium R. Further, in the present example embodiment, since the sensor assembly 50 is also housed in the cooling chamber 91, the sensor assembly 50 can be cooled by the cooling medium R.

As described above, according to the present example embodiment, not only the stator 30 but also each portion of the motor 1 housed in the closed chamber 90 can be cooled. In the following description, a portion of the motor 1 cooled by the cooling medium R housed in the closed chamber 90 may be collectively referred to as the "stator 30 or the like".

Further, since the plurality of coils 33 and at least a part of the rotor 20 are housed in the closed chamber 90, it is not necessary to provide a partition between the rotor 20 and the stator 30 in order to form the closed chamber 90. As a result, the gap in the radial direction between the rotor 20 and the stator 30 can be reduced. Accordingly, the output of the motor 1 can be further improved.

Further, the fins 71a as the heat dissipation portions are provided in the motor 1. Thus, the heat of the cooling medium R in the closed chamber 90 can be released to the outside through the fins 71a. As a result, the heat released from the stator 30 or the like to the cooling medium R can be released to the outside of the motor 1 to cool the cooling medium R. Accordingly, the stator 30 or the like can be more suitably cooled by the cooling medium R, and the cooling efficiency of the stator 30 or the like can be further improved. Further, since the cooling medium R can be cooled while being housed in the closed chamber 90 by the fins 71a as the heat dissipation portions, it is not necessary to guide the cooling medium R to the outside of the motor 1 and cool the cooling medium in another device, for example. Accordingly, it is possible to prevent the structure of the motor 1 from becoming complicated, and it is possible to prevent the size of the motor 1 from becoming large. In the present example embodiment, since the fin 71a is made from metal, the thermal conductivity of the fin 71a tends to be relatively high. Thus, the heat of the cooling medium R can be suitably released to the outside through the fins 71a.

In the present example embodiment, the cooling medium R of which the temperature is increased by cooling each portion of the motor 1 in the cooling chamber 91 moves upward through the extension portion 93 and flows into the inside of the heat dissipation chamber 92 from the first connection portion 94. The heat of the cooling medium R flowed into the heat dissipation chamber 92 is released to the outside of the motor 1 via the fins 71a. The cooling medium R of which the temperature is decreased due to heat released to the outside of the motor 1 by the fins 71a moves downward within the heat dissipation chamber 92 and returns from the second connection portion 95 to the cooling chamber 91. As described above, according to the present example embodiment, since the closed chamber 90 has the cooling chamber 91, the extension portion 93, the first connection portion 94, and the second connection portion 95, the cooling medium R can be suitably circulated between the cooling chamber 91 and the heat dissipation chamber 92, that is, between the cooling chamber 91 and the inside of the fin 71a. As a result, the cooling medium R having a relatively low temperature cooled through the fins 71a can flow into the cooling chamber 91, and the stator 30 or the like can be suitably cooled. In the present example embodiment, since the cooling medium R within the closed chamber 90 can be agitated by the rotor 20 as described above, the circulation of the cooling medium R between the cooling chamber 91 and the heat dissipation chamber 92 tends to occur more suitably.

Here, when the amount of heat generated in the coils 33 is relatively small, the cooling medium R is circulated as the cooling liquid RL within the closed chamber 90. On the other hand, when the amount of heat generated in the coils 33 becomes relatively large due to an increase in a rotation speed of the motor 1, a part of the cooling liquid RL is vaporized to become the gas RG. Thus, the stator 30 or the like can be more preferably cooled by the vaporization heat when the cooling liquid RL is vaporized. Accordingly, the cooling efficiency of the stator 30 or the like can be further improved.

When a part of the cooling liquid RL is vaporized to become the gas RG, as shown in FIG. 6, the gas RG moves upward through the extension portion 93 and flows into the inside of the heat dissipation chamber 92 from the first connection portion 94. The gas RG flowed into the heat dissipation chamber 92 is cooled via the fins 71a to condense into the cooling liquid RL, and then flows into the cooling chamber 91 again from the second connection portion 95. Note that, a temperature of the cooling liquid RL is equal to or less than a temperature of the gas RG. Thus, in a case where the cooling medium R changes from the gas RG to the cooling liquid RL when the cooling medium R flows into the cooling chamber 91 again, even though the temperature of the cooling liquid RL is any temperature, the stator 30 or the like can be suitably cooled by the cooling medium R flowed into again, that is, the cooling liquid RL.

Here, when the temperature of the cooling medium R is increased due to the heat of the stator 30 or the like, since the volume of the cooling medium R expands, the pressure in the closed chamber 90 tends to be increased. In particular, when a part of the cooling liquid RL is vaporized to become the gas RG, the volume of the cooling medium R expands greatly, and the pressure in the closed chamber 90 tends to be increased significantly. On the other hand, according to the present example embodiment, the pressure adjustment portion 60 capable of adjusting the pressure in the closed chamber 90 is provided. Thus, it is possible to prevent the pressure in the closed chamber 90 from being increased by the pressure adjustment portion 60.

Specifically, in the present example embodiment, the pressure adjustment portion 60 is a container shape having a variable volume. Thus, when the volume of the cooling medium R expands, the volume of the pressure adjustment portion 60 becomes large, and the pressure in the closed chamber 90 can be released. In the present example embodiment, since the pressure adjustment portion 60 has a bellows structure, as shown in FIG. 3, the pressure adjustment portion 60 extends in the axial direction due to the bellows structure, and the volume of the pressure adjustment portion 60 is increased. As a result, the pressure within the closed chamber 90 can be released, and the pressure in the closed chamber 90 can be prevented from being increased.

Further, in the motor 1, since the temperature of the coil 33 tends to be the highest, the temperature of the cooling medium R in contact with the coil 33 tends to be particularly high. Thus, the cooling medium R tends to be increased around the coil 33. On the other hand, according to the present example embodiment, the extension portion 93 is positioned above the coil 33. Thus, the cooling medium R rising from the coil 33 tends to flow into the extension portion 93, and the cooling medium R tends to be circulated between the cooling chamber 91 and the heat dissipation chamber 92. Further, when a part of the cooling liquid RL is vaporized to become the gas RG around the coil 33, the gas RG tends to be guided to the extension portion 93, and the gas RG tends to flow into the heat dissipation chamber 92. Thus, the gas RG tends to be cooled by the fins 71a, and the gas RG tends to return to the cooling liquid RL.

Further, according to the present example embodiment, the extension portion 93 is provided between the housing body 11 and the tubular portion 12b in the radial direction. Thus, the extension portion 93 can be easily provided above the coil 33. Further, the extension portion 93 that guides the cooling medium R from the cooling chamber 91 to the heat dissipation chamber 92 tends to be relatively narrow, and the volume of the entire closed chamber 90 tends to be small. As a result, it is possible to prevent the mass of the motor 1 from being increased.

Further, according to the present example embodiment, the rotor body 20a is housed in the closed chamber 90. Thus, the cooling medium R within the closed chamber 90 can be more suitably agitated by the rotor body 20a. As a result, the cooling medium R can be more suitably circulated within the closed chamber 90, and the cooling efficiency of the stator 30 or the like can be further improved.

Further, according to the present example embodiment, the heat dissipation portions are the hollow fins 71a provided on the outer surface of the housing 10. Thus, the cooling medium R flows into the fins 71a as described above, and thus, the heat tends to be released from the cooling medium R to the outside of the motor 1 via the fins 71a as compared with the case where the heat dissipation portions are solid fins. As a result, the cooling efficiency of the stator 30 or the like can be further improved.

Further, according to the present example embodiment, the annular gap G that connects the insides of the plurality of fins 71a between the plurality of fins 71a and the housing body 11 in the radial direction by providing the lower ring member 74 and the upper ring member 75. Thus, the cooling medium R flowed into the heat dissipation chamber 92 via the first connection portion 94 tends to flow into the insides of the plurality of fins 71a through the gap G. Further, according to the present example embodiment, as described above, the hollow fins 71a can be suitably maintained in an opened state by the groove portions 72c and 73c and the protrusion plate portions 74c and 75c. Thus, the cooling medium R tends to flow into the fins 71a.

Further, for example, when a part of the cooling liquid RL is vaporized to become the gas RG as shown in FIG. 3, the gas RG is accumulated in the upper portion of the closed chamber 90. Since the temperature of the gas RG is relatively high, the portion such as the stator 30 or the like exposed to the gas RG is difficult to be cooled. In particular, when the coil 33 which is the heating element is exposed to the gas RG, there is a concern that it is difficult to improve the cooling efficiency of the stator 30.

On the other hand, according to the present example embodiment, at least a part of the fins 71a is positioned above the coil 33. Thus, the vaporized gas RG flows to the portion of the inside of the hollow fin 71a positioned above the coil 33, and thus, the coil 33 can be prevented from being exposed to the gas RG. As a result, the state where the coil 33 is immersed in the cooling liquid RL tends to be maintained, and the stator 30 can be suitably cooled. Accordingly, the cooling efficiency of the stator 30 can be improved. In the present example embodiment, in the second state S2 shown in FIG. 3, for example, the gas RG is accumulated in the heat dissipation chamber 92, the extension portion 93, and the first connection portion 94, and is not accumulated in the cooling chamber 91 and the pressure adjustment chamber 96.

Further, according to the present example embodiment, all the fins 71a are positioned above the stator core 31. Thus, when a part of the cooling liquid RL is vaporized to generate the gas RG, the stator 30 tends to be immersed in the cooling liquid RL while the gas RG suitably flows into the fins 71a. As a result, the stator 30 tends to be cooled by the cooling liquid RL while the fin 71a suitably exchanges heat between the gas RG and an outside air. Accordingly, the cooling efficiency of stator 30 can be further improved. Further, a dimension of the fin 71a in the axial direction tends to be decreased as compared with the case where the fins 71a are positioned on the outside of the stator core 31 in the radial direction. Thus, the weight of the motor 1 tends to be decreased.

Further, according to the present example embodiment, the pressure adjustment portion 60 is positioned downward from the fin 71a which is the heat dissipation portion. Thus, the cooling medium R of which the temperature is relatively high due to the heat of the stator 30 or the like is difficult to flow to the pressure adjustment portion 60, and the cooling medium R tends to flow near the fins 71a. In the present example embodiment, the cooling medium R tends to flow into the fins 71a. As a result, the heat of the cooling medium R can be suitably released from the fins 71a to the outside of the motor 1. Accordingly, the cooling efficiency of the stator 30 or the like can be further improved.

Further, according to the present example embodiment, the thermal conductivity of the fin 71a which is the heat dissipation portion is higher than the thermal conductivity of the pressure adjustment portion 60. Thus, the cooling medium R of which the temperature is increased tends to flow to the fins 71a than the pressure adjustment portion 60, and thus, the heat of the cooling medium R can be more suitably released to the outside of the motor 1 through the fins 71a. As a result, the cooling efficiency of the stator 30 or the like can be further improved. In particular, when the pressure adjustment portion 60 is made from rubber as in the present example embodiment, the thermal conductivity of the pressure adjustment portion 60 tends to be relatively low. Thus, even though the cooling medium R of which the temperature is increased, particularly the gas RG flows into the pressure adjustment portion 60, it is difficult to release the heat of the cooling medium R to the outside. Accordingly, an effect that the cooling medium R of which the temperature is increased is difficult to flow to the pressure adjustment portion 60 and tends to flow to the fin 71a can be obtained more usefully.

Further, according to the present example embodiment, the cooling medium R is filled in the entire inside of the closed chamber 90. Thus, all the portions of the motor 1 housed in the closed chamber 90 can be suitably cooled by the cooling medium R. As a result, the cooling efficiency of the stator 30 or the like can be further improved. Further, when the entire cooling medium R is the cooling liquid RL as in the first state S1 shown in FIG. 2, a void is not generated inside the closed chamber 90. Thus, a liquid level that becomes a boundary between the void and the cooling liquid RL is not generated within the closed chamber 90. As a result, in the first state S1, even though the cooling liquid RL is shaken in the closed chamber 90, the liquid levels of the cooling liquid RL do not collide with each other. As a result, it is possible to prevent noise from being generated due to the shaking of the cooling liquid RL.

Further, according to the present example embodiment, the cooling medium R is a fluorine compound. Thus, a viscosity of the cooling medium R as the liquid, that is, the cooling liquid RL tends to be relatively low. As a result, it is possible to reduce a resistance applied to the rotor 20 from the cooling liquid RL when the cooling liquid RL within the closed chamber 90 is agitated by the rotor 20. Accordingly, an energy loss of the motor 1 can be reduced.

Further, according to the present example embodiment, the lower bearing 25 is housed in the closed chamber 90. Thus, it is not necessary to provide the sealing member for partitioning the lower bearing 25 from the closed chamber 90, and it is possible to prevent the number of parts of the motor 1 from being increased. Further, since it is not necessary to provide the sealing member for partitioning the lower bearing 25 from the closed chamber 90, it is possible to prevent the motor 1 from becoming large in the axial direction.

Further, according to the present example embodiment, the lubricant is mixed in the cooling medium R. Thus, the lubricant can be supplied to the lower bearing 25 housed in the closed chamber 90 via the cooling medium R. As a result, the lubricity of the lower bearing 25 housed in the closed chamber 90 can be ensured. Further, a boiling point of the cooling medium R tends to increase due to the mixing of the lubricant. Thus, the temperature of the gas RG generated by vaporizing the cooling liquid RL becomes higher. As a result, a difference between the temperature of the gas RG and the temperature outside the motor 1 can be increased, and the heat exchange efficiency of the fins 71a can be improved. Accordingly, the cooling efficiency of the stator 30 or the like can be further improved.

Further, according to the present example embodiment, the sealing member 80 for sealing between the outer peripheral surface of the shaft 21 and the inner peripheral surface of the through-hole 12p is provided below the upper bearing 24. Thus, the cooling medium R can be prevented from being in contact with the upper bearing 24 by the sealing member 80. As a result, it is possible to prevent the lubricant of the upper bearing 24 from flowing by the cooling medium R, and it is possible to suitably maintain the lubricity of the upper bearing 24. Accordingly, the shaft 21 can be suitably supported by the upper bearing 24.

Further, according to the present example embodiment, the upper lid portion 12 has the first holding member 12a for holding the upper bearing 24 and the second holding member 40 fixed to the lower side of the first holding member 12a to hold the sealing member 80. Thus, the first holding member 12a and the second holding member 40 are sequentially assembled, and thus, a structure in which the sealing member 80 is arranged below the upper bearing 24 tends to be adopted.

Further, according to the present example embodiment, the second holding member 40 is fixed to the first holding member 12a by the bolt 81 that penetrates the first holding member 12a from above and is fastened to the second holding member 40. Thus, the following procedure for assembling the upper lid portion 12 can be adopted.

Figure 7:
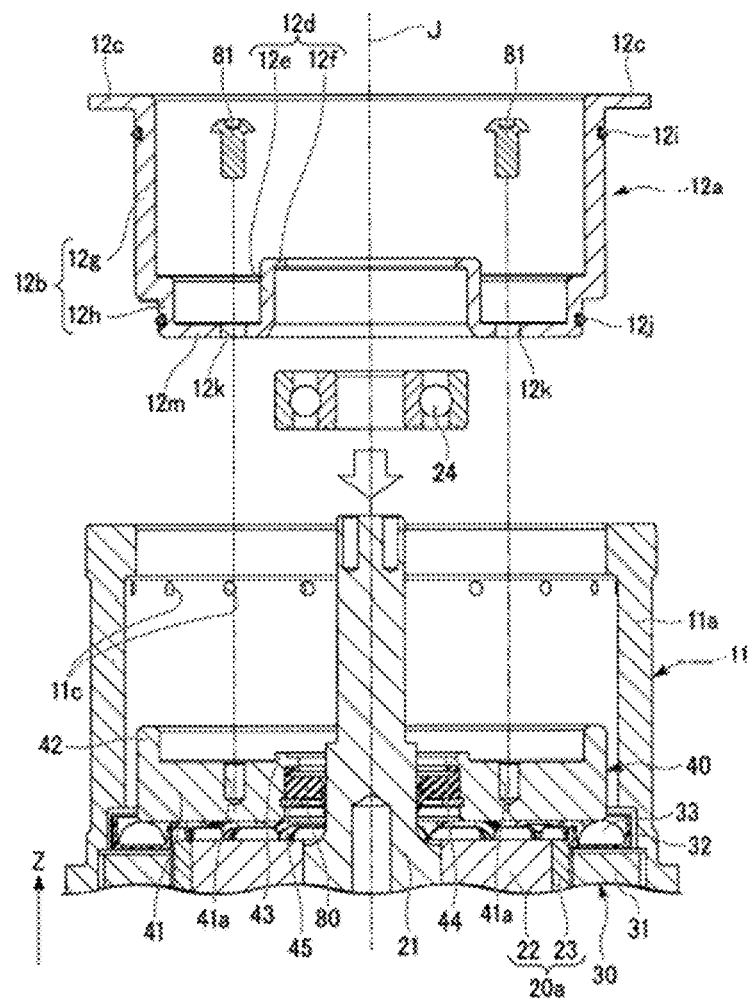
FIG. 7 is a cross-sectional view showing one process of a procedure of assembling an upper lid portion according to an example embodiment of the present disclosure.

As shown in FIG. 7, a worker or the like assembling the upper lid portion 12 arranges the second holding member 40 in a state of holding the sealing member 80 within the housing body 11. At this time, the second holding member 40 is supported from below by, for example, the stator 30. Note that, when the second holding member 40 is arranged within the housing body 11, at least the stator 30, the shaft 21, and the rotor body 20a are housed in the housing body 11.

Figure 8:
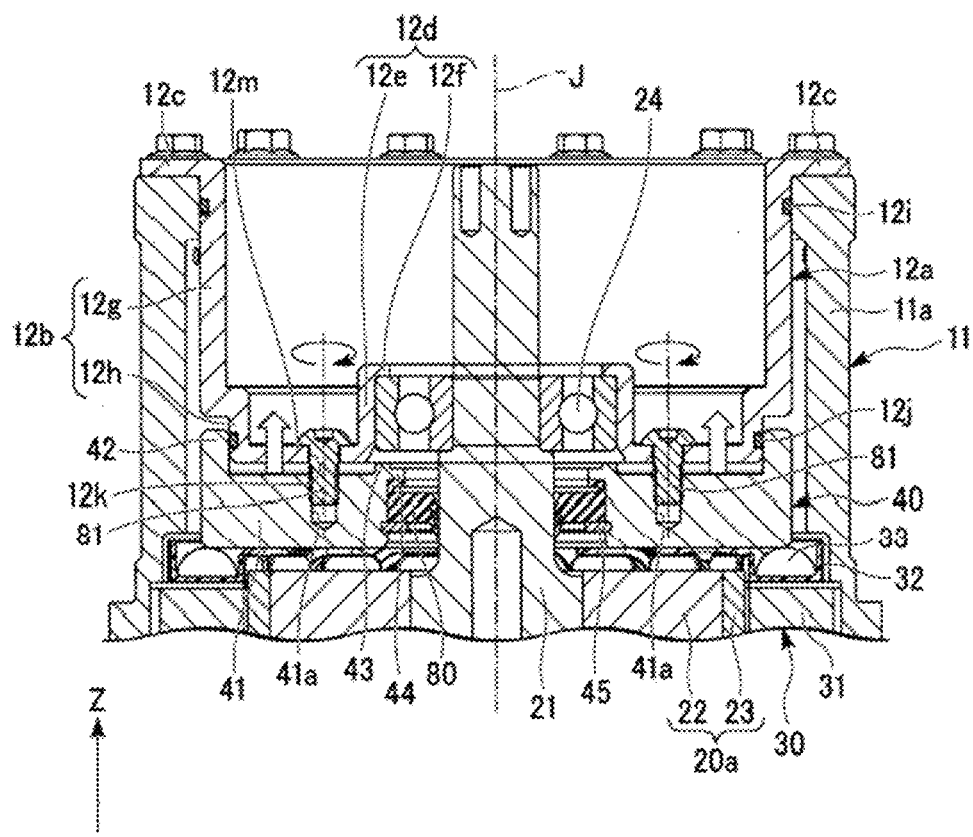
FIG. 8 is a cross-sectional view showing another process of the procedure of assembling an upper lid portion according to an example embodiment of the present disclosure.

Subsequently, the worker or the like presses the upper bearing 24 into the shaft 21 from above, and then fixes the first holding member 12a to the housing body 11. As shown in FIG. 8, after the first holding member 12a is fixed to the housing body 11, the worker or the like fastens the bolt 81 from above into the female screw hole 41a via the hole portion 12k. Here, since the first holding member 12a is fixed to the housing body 11, the second holding member 40 is pulled upward by fastening the bolt 81. As a result, the second holding member 40 is fixed to the lower side of the first holding member 12a.

As described above, the structure in which the first holding member 12a and the second holding member 40 are fixed by the bolt 81 fastened to the second holding member 40 from above is adopted, and thus, the second holding member 40 can be fixed to the lower side of the first holding member 12a even though the second holding member 40 is arranged within the housing body 11 earlier than the first holding member 12a. As a result, it is possible to easily adopt the structure in which the sealing member 80 is arranged below the upper bearing 24.

Note that, in the present description, the term "worker or the like" includes a worker who performs each work, an assembling device, and the like. Each work may be performed only by a worker, may be performed only by an assembling device, or may be performed by a worker and an assembling device.

Further, in a case where the above-mentioned assembly procedure is adopted, when the first holding member 12a and the second holding member 40 are fixed, the second holding member 40 is covered from above by the first holding member 12a. Thus, it may be difficult to interfere with the second holding member 40, and it may be difficult to align the second holding member 40 with the first holding member 12a.

On the other hand, according to the present example embodiment, the first holding member 12a and the second holding member 40 have the fitting portions 12h and 42 that are fitted to each other. Thus, the second holding member 40 can be aligned with the first holding member 12a by the fitting portions 12h and 42. As a result, even though the above-mentioned assembly procedure is adopted, the second holding member 40 can be fixed to the first holding member 12a with high position accuracy.

Further, according to the present example embodiment, the second holding member 40 has the first support portion 43 that supports the upper bearing 24 from below. Thus, it is not necessary to provide the member for supporting the upper bearing 24 from below in addition to the second holding member 40. As a result, it is possible to prevent the number of parts of the motor 1 from being increased.

The present disclosure is not limited to the above-described example embodiment, and other configurations may be adopted within the scope of the technical idea of the present disclosure. The portion housed in the closed chamber may or may not include any other portion as long as the portion includes the plurality of coils and at least a portion of the rotor. A part of the shaft may be housed in the closed chamber, and the rotor body may not be housed.

The configuration of the heat dissipation portion is not particularly limited as long as the heat of the cooling medium within the closed chamber can be released to the outside. The heat dissipation portions may be arranged on the outside of the stator core in the radial direction. In this case, for example, in the above-described example embodiment, the lower end portion of the fin 71a may extend to the outside of the stator core 31 in the radial direction. The heat dissipation portions may be solid fins. When the heat dissipation portions are fins, the number of fins is not particularly limited. The heat dissipation portion may be, for example, a water jacket. The material of the heat dissipation portion is not particularly limited, and may be a material other than metal.

The configuration of the pressure adjustment portion is not particularly limited as long as the pressure in the closed chamber can be adjusted. The pressure adjustment portion may not have the bellows structure. The pressure adjustment portion may not have the container shape. The pressure adjustment portion may be, for example, an elastic member constituting a part of the wall portion constituting the closed chamber. The pressure adjustment portion may be provided at any position. The material of the pressure adjustment portion is not particularly limited, and may be, for example, metal.

The bearings that rotatably support the shaft may be provided such that all the bearings are housed inside the closed chamber or all the bearings are arranged outside the closed chamber. That is, in the above-described example embodiment, both the upper bearing 24 and the lower bearing 25 may be housed inside the closed chamber 90, or both the bearings may be arranged outside the closed chamber 90. For example, when the lower bearing 25 is arranged outside the closed chamber 90, a sealing member similar to the sealing member 80 described above may be provided above the lower bearing 25.

The method and the procedure for fixing the first holding member and the second holding member are not particularly limited. The lid portion positioned on one side of the stator in the axial direction may be a single member. That is, for example, in the above-described example embodiment, the upper lid portion 12 may be a single member in which the first holding member 12a and the second holding member 40 are integrally molded.

The type of the cooling medium is not particularly limited as long as the cooling medium can cool a target to be cooled within the closed chamber. The cooling medium may not be the fluorine compound. The cooling medium may not have the insulation property. In this case, the stator or the like may be insulated. The cooling medium may be housed only in a part of the inside of the closed chamber.

The application of the motor according to the above-described example embodiment is not particularly limited. The motor may be mounted on a device other than the unmanned aerial vehicle. The configuration described in the present specification may be combined appropriately as long as no conflict arises.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor that is rotatable about a central axis;
a stator that includes coils and opposes the rotor with a gap interposed therebetween;
a housing that defines at least a portion of a closed chamber in which a cooling medium is housed;
heat dissipation portions that are able to release heat of the cooling medium in the closed chamber to an outside; and
a pressure adjustment portion that is able to adjust a pressure in the closed chamber; wherein
the pressure adjustment portion is defined by a container portion which has a variable volume; and
at least a portion of the coils and the rotor is housed in the closed chamber.

2. The motor according to claim 1, wherein
the rotor includes:
a shaft that extends about the central axis; and
a rotor body that is fixed to the shaft; and
the rotor body is housed in the closed chamber.

3. The motor according to claim 1, wherein
the heat dissipation portions include hollow fins on an outer surface of the housing; and
an inside of the closed chamber includes insides of the heat dissipation portions.

4. The motor according to claim 3, wherein
at least a portion of the heat dissipation portions is positioned above the coil in a vertical direction.

5. The motor according to claim 4, wherein
all the heat dissipation portions are positioned above a stator core of the stator in the vertical direction.

6. The motor according to claim 3, wherein
the closed chamber includes:
a cooling chamber in which the coils are housed;
an extension portion that extends upward in a vertical direction from the cooling chamber;
a first connection portion that connects an inside of the extension portion and the insides of the heat dissipation portions; and
a second connection portion that is positioned below the first connection portion in a vertical direction, and connects the insides of the heat dissipation portions and an inside of the cooling chamber.

7. The motor according to claim 6, wherein
the extension portion is positioned above the coil in the vertical direction.

8. The motor according to claim 6, wherein
the housing includes:
a tubular housing body that extends in an axial direction; and
a lid portion that is fixed to the housing body, and is positioned on one side of the stator in the axial direction;
the lid portion includes a tubular portion that opposes an inside of the housing body in a radial direction with a gap interposed therebetween; and
the extension portion is provided between the housing body and the tubular portion in the radial direction.

9. The motor according to claim 1, further comprising:
a bearing that rotatably supports the rotor; wherein
the bearing is housed in the closed chamber.

10. The motor according to claim 9, wherein
a lubricant is mixed in the cooling medium.

11. The motor according to claim 1, wherein
the cooling medium fills an entire inside or substantially an entire inside of the closed chamber.

12. The motor according to claim 1, wherein
the cooling medium has an insulation property.

13. The motor according to claim 1, wherein
the cooling medium is a fluorine-based compound.

* * * * *